Sept. 13, 1960     P. J. COSTA ET AL     2,952,346
ELECTRICALLY CONTROLLED FLUID ACTUATED TRANSMISSION
Filed Feb. 27, 1959     3 Sheets-Sheet 1
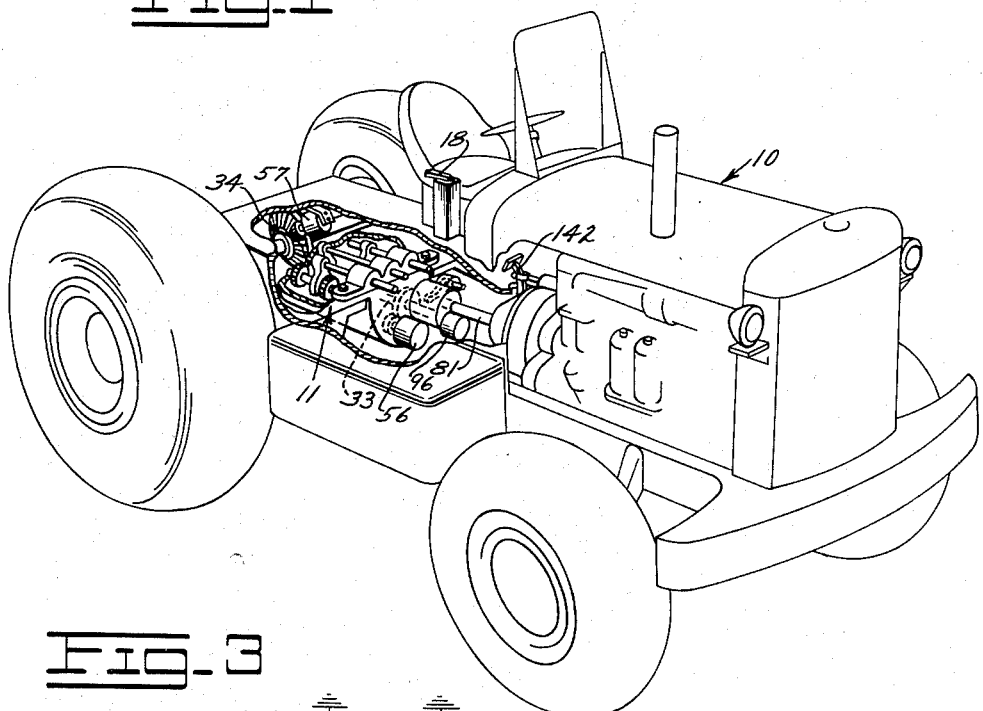
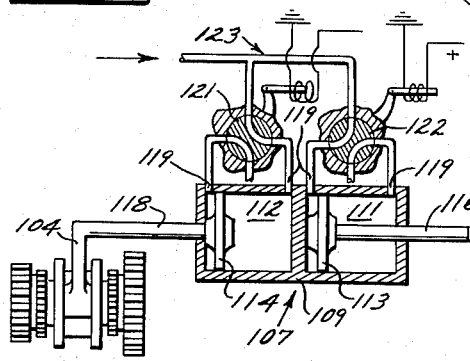
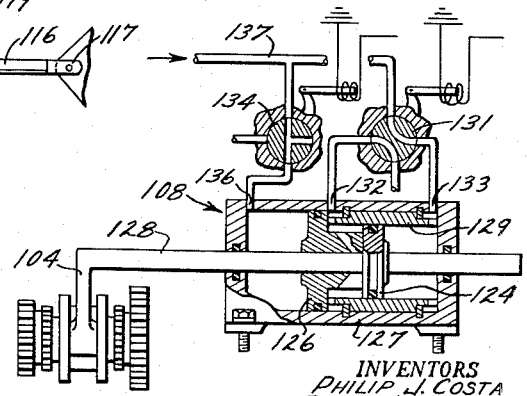
INVENTORS
PHILIP J. COSTA
ERNEST W. WAGNER
DARRELL E. STAFFORD
IVAN R. LAMPORT
EDWARD F. RANDOLPH
BY
ATTORNEYS

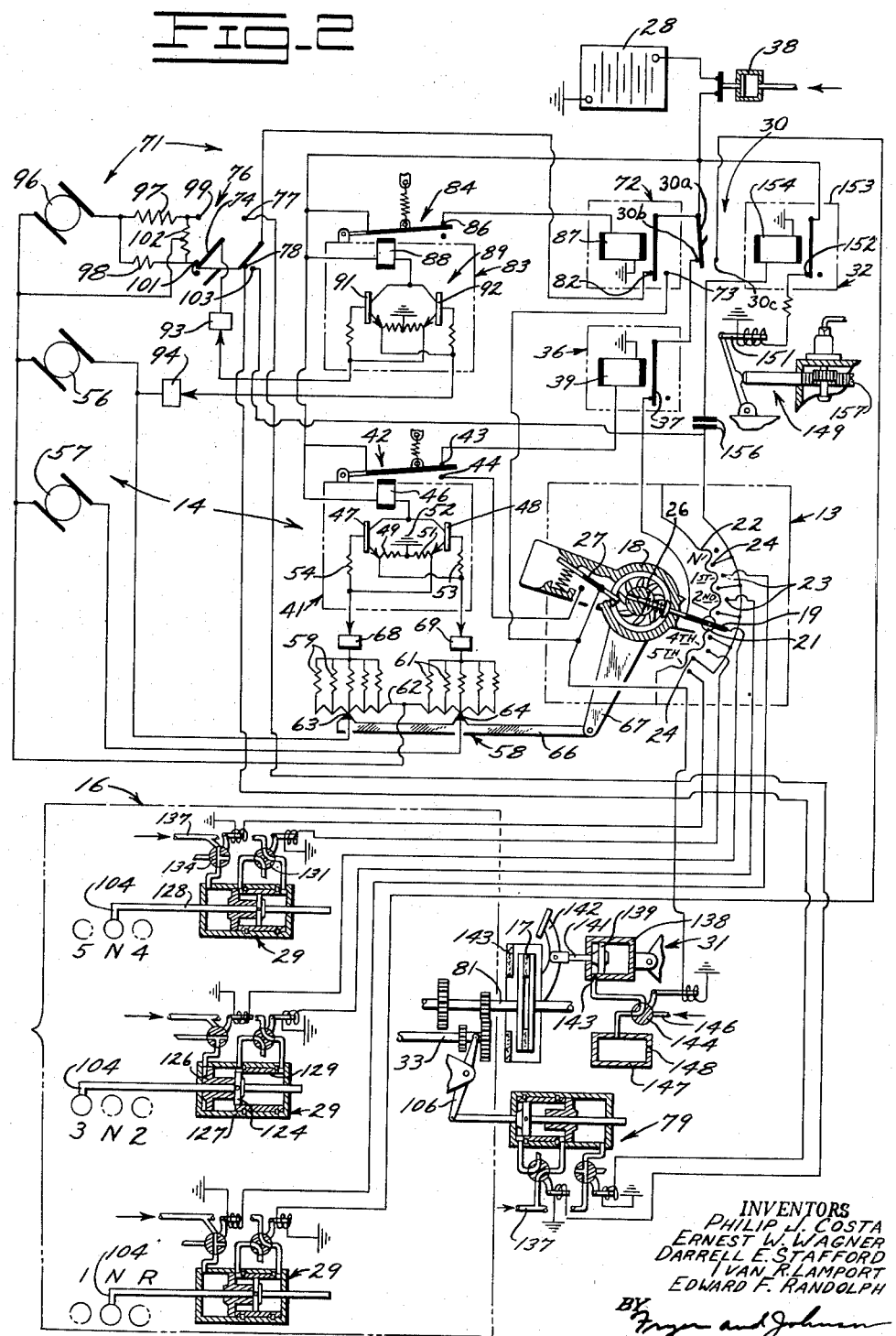

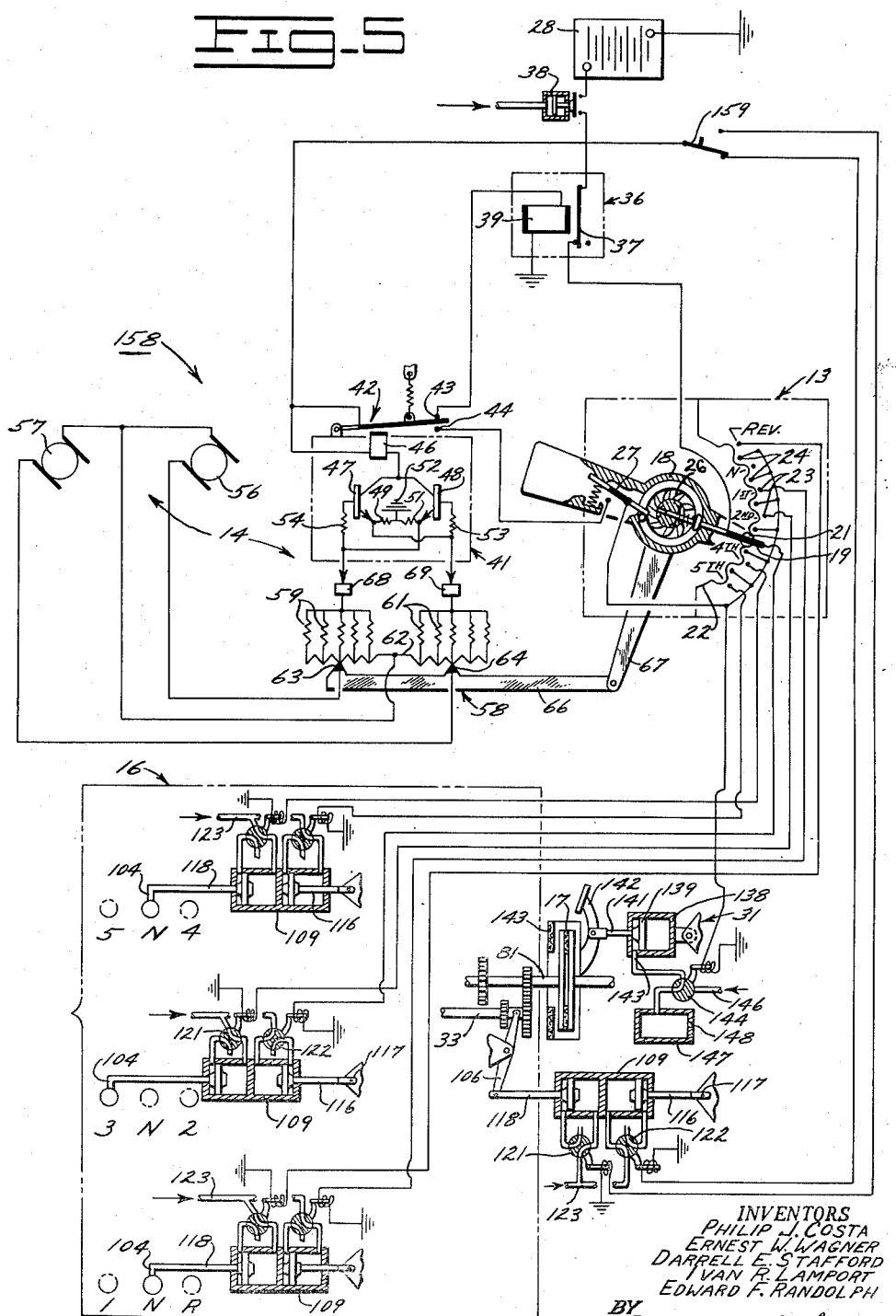

United States Patent Office 2,952,346
Patented Sept. 13, 1960

2,952,346

ELECTRICALLY CONTROLLED FLUID ACTUATED TRANSMISSION

Philip J. Costa, Peoria, Ernest W. Wagner, East Peoria, Darrell E. Stafford, Peoria, Ivan R. Lamport, East Peoria, and Edward F. Randolph, Washington, Ill., assignors to Caterpillar Tractor Co., Peoria, Ill., a corporation of California Filed Feb. 27, 1959, Ser. No. 796,061

15 Claims. (Cl. 192—.092)

The present invention relates generally to control means for changing the speed range of a power transmission, and more particularly to an electrically controlled fluid operated system for the selective change of the speed range of a transmission in a minimum of time and with substantially no clashing resulting from the shifting operation.

In the selective shifting of the gears of a transmission, it is desirable that the shifting operation be accomplished with as little clashing as possible. This is particularly true in heavy earth moving equipment such as tractors, graders, and the like, where every second of productive time is of paramount importance and the many requisite shifting operations should therefore be completed in as short a time as possible. Failure to complete a shift under load, as when a machine is traveling uphill, necessitates stopping and shifting to a lower ratio than would otherwise be necessary thus occasioning further loss of time.

Advantages are accordingly to be gained in the provision of means for shifting or changing the speed range of a transmission without clashing and with a minimum of time to complete the operation. The present invention accomplishes the foregoing and possesses further advantages by providing a change-speed transmission system in which changes in speed range as selected by an operator are effected automatically by fluid servo actuating means at the command of an electric control circuit which senses with extreme accuracy the instant the input and output shafts of the transmission are turning with synchronous speeds.

It is an object of the present invention to provide a transmission change speed control having sensitive speed synchronizing means to automatically effect a power shift selected by manipulation of a manual selector control.

Another object of this invention is the provision of a transmission manually selectable power shift control having a varied automatic shaft speed synchronizing action for up and down shifts.

Still another object of the present invention is to provide an automatic preselective shift control for a transmission wherein an automatic declutching action is provided for up-shift selections and the reengagement of the clutch upon completion of the shift is modulated automatically.

Yet another object of the invention is to provide for the preselected automatic shifting of the gears of a primary transmission and auxiliary overdrive transmission when the selected gears are in synchronism.

A further object of the present invention is to provide a transistorized synchronous speed sensing control for determining when preselected gear speed ratios are obtained in a transmission and responsively signalling a servo system to engage the selected gears at such instant of synchronism.

Further objects and advantages of the invention and the manner in which it is carried into practice are made apparent in the following specification wherein reference is made to the accompanying drawings.

In the drawings:

Fig. 1 is a schematic illustration of a heavy earth moving vehicle employing an electric fluid transmission shift control embodying the present invention;

Fig. 2 is a schematic circuit diagram of a preferred embodiment of the electric fluid shift control;

Fig. 3 is a schematic cross-section of a pneumatic fluid servo which may be employed in connection with the shift control of Fig. 2;

Fig. 4 is a schematic cross-section of a hydraulic fluid servo which may be employed in connection with the shift control of Fig. 2; and Fig. 5 is a schematic circuit diagram of a modified form of the embodiment of Fig. 2.

Referring first to Fig. 1 of the drawings a tractor generally indicated at 10 is shown as having a gear type transmission 11. As shown in Fig. 2 the control for the transmission 11 comprises a manual speed range selector control generally shown at 13 which is physically mounted in a readily accessible location to the operator of the vehicle. The selector control is responsively coupled to an electronic speed sensing control circuit 14 and is also coupled to an electromagnetically actuated fluid servo system 16 which is adapted to shift the gears of transmission 11 to speed ranges selected by selector control 13 and to actuate a clutch 17 and other associated mechanisms in cooperation therewith. The control circuit 14 automatically determines the operation of the various portions of the servo system 16 in response to the selection of a speed range at manual selector control 13. In this connection, the control circuit 14 detects with extreme accuracy the instant the relative speeds of the selected gears are synchronized and signals the servo system 16 through selector control 13 to engage the selected gears at the instant of synchronism. The selected change in speed range is hence automatically and rapidly accomplished without clashing by virtue of the precise synchronous control of the servo system 16 by the speed sensing control circuit 14.

Selector control 13 preferably comprises a rotary operating selector lever 18 having a spring loaded plunger contactor 19. A roller 21 is secured to the contactor and engages a fixed arcuately undulated cam edge 22 concentrically disposed relative to the center of rotation of lever 18. Cam edge 22 includes an undulation for each of the speed ranges of the transmission 11, there being five as shown, and a neutral position. Disposed radially outwardly from the troughs and crests of the undulations in equally spaced relation are two groups of stationary contacts 23 and 24. The roller 21 in passing over the cam ridge 22 upon rotation of lever 18 hence causes the plunger contactor 19 to move radially in and out into alternate sequential contact with the contacts 23 and 24. In addition an over-running clutch element such as a pawl wheel 26 is secured to lever 18 to close a microswitch 27 mounted thereon only upon rotation of the lever in one direction, which in the present instance is clockwise. As the lever is rotated clockwise, which direction is taken to correspond to an up-shift selection of speed range, the over-running clutch engages the pivoted contact of micro switch 27 and moves it into engagement with the fixed contact thereof to close the switch.

The selector control 13 is responsively coupled through the control circuit 14 in a manner which is subsequently described to a source of servo actuating current such as a storage battery 28. The battery current is applied under the control and direction of the circuit 14 through selector control 13 to appropriate portions of servo system 16. More specifically, the servo operating current as controlled by circuit 14 is applied through plunger contactor 19 to the particular contacts 23 corresponding to the various speed range selective positions of lever 18 and to contacts 24 upon the initiation of rotary movement of the lever to another speed range position. The controlled operating current is also applied to micro switch 27 and such switch passes the current therethrough upon the switch closure effected by initial clockwise rotation of lever 18 to another up-shift speed range position. The contacts 23 corresponding each to a different one of the various selectable speed ranges are in turn connected to the corresponding gear engaging portions 29 of the servo system 16. The contacts 24 are ganged and connected to a fuel pump bumper actuating portion 32 of the servo system for reducing the engine load on the transmission 11 without materially decelerating the engine. The micro switch 27 is in turn connected to a clutch actuating portion 31 of the servo system which serves to engage and disengage the clutch 17. The various portions 29, 31, 32 of the servo system 16, as are subsequently described in detail as to structure and function, are thus actuated by movement of selector control lever 18 to a different speed range selecting position. Upon initial movement of lever 18, contact is broken between plunger contactor 19 and the contact 23 corresponding to the previous selected speed range. The resulting interruption in current to the corresponding servo system gear engaging portion 29 neutralizes the transmission 11 to thereby instantaneously effect a change in the speed ratio between the input and output shafts 33, 34 respectively thereof. In addition, contact is simultaneously made between contactor 19 and one of the contacts 24 while, in the case of an up-shift (clockwise rotation of lever 18), micro switch 27 is closed to actuate the clutch and fuel pump bumper servo portions 31, 32 which in turn effect a change in the input and output shaft speeds approaching the speed ratio selected upon completion of movement of the lever 18 to the desired speed range position. Control circuit 14 then actuates the servo system 16 to effect shifting of the gears in the desired selected speed range when the speed ratio of input and output shafts 33, 34 is synchronous therewith.

Considering now the control circuit 14 in detail, it includes a master control relay 36 having normally open contacts 37 serially coupled between battery 28 and contactor 19 of selector control 13. A pressure switch 38, which is closed by the pressure of fluid supplied to the servo system 16, may also be inserted in series with battery 28 to open the circuit in the event of a loss of servo fluid pressure. The supply of current to the operating solenoid 39 of relay 36 is controlled by a differential current detector circuit 41. Differential circuit 41 functions to apply current to solenoid 39 only when the input and output shafts 33, 34 of transmission 11 are rotating synchronously with a particular speed range selected by selector control 13.

To this end, differential circuit 41 preferably includes a relay 42 having a normally closed contact 43 series connected between battery 28 and one terminal of solenoid 39, the other side of which is connected to ground. Relay 42 further includes a normally open contact 44 connected between the battery 28 and the micro switch 27 of selector control 13 for purposes which are subsequently described. The operating solenoid 46 of relay 42 is energized by null balance means which provides a current flow only when currents applied to first and second inputs thereof are unbalanced. The null balance means may comprise a differential relay or more preferably a pair of transistors 47, 48 connected as a differential current switch. In this connection, the collectors of transistors 47, 48 are commonly connected to one terminal of relay operating solenoid 46, the other terminal of which is coupled to battery 28 through the fail safe pressure switch 38. The emitters of the transistors are respectively connected to equal ohmage resistors 49, 51 connected in series therebetween and having their common juncture connected to ground as shown generally at 52. The emitters are further connected to equal ohmage bias resistors 53, 54 which are in turn respectively connected to the base of the opposite transistor, i.e., resistor 53 is connected between the emitter of transistor 47 and base of transistor 48 whereas resistor 54 is connected between the emitter of transistor 48 and base of transistor 47. The junctures between the emitters and resistors 53, 54 provide first and second inputs to the transistorized differential current switch. When currents applied to such first and second inputs are balanced, transistors 47 and 48 both maintain a positive polarity and no current flows from solenoid 46 through the collector-emitter circuits of the transistors. When there is an unbalance between currents applied to the first and second inputs, the transistor to which the greatest current is applied changes to a negative polarity and current hence flows through the collector-emitter circuit of same to ground at point 52. Such current flow which is also through solenoid 46 hence energizes relay 42 which thereby de-energizes main control relay 36 by interrupting the flow of current to solenoid 39 and applies current to micro switch 27.

Regarding the manner in which the inputs of differential circuit 41 are energized so as to sense synchronous speeds of the input and output shafts 33, 34 of transmission 11, it is to be appreciated that at synchronism the speeds of the input and output shafts are generally different, but in a fixed ratio. Moreover, the fixed ratio is variable as determined by particular settings of selector control 13. Hence the shaft speeds must be converted to proportional electric currents and at any one of the particular selectable fixed speed ratios, the usually dissimilar currents must be rendered equal at synchronism in their applications to the inputs of differential circuit 41. To accomplish the foregoing, a pair of tachometer generators 56, 57, or equivalent angular velocity transducers, respectively connected to the input and output shafts 33 and 34. Generators 56, 57 in a well known manner generate alternating currents which are directly proportional to the rotational velocities of input and output shafts 33 and 34 of transmission 11. The generator currents are respectively applied to a double potentiometer 58 which is controlled by selector control 13. The potentiometer 58 includes first and second sets of paralleled resistors 59, 61 with the resistance ratio of each pair thereof as selected by selector control 13 being inversely proportional to the corresponding shaft speed ratio of each speed range selected by the selector control. Hence the output currents through a selected pair of the resistors 59, 61 are equal when the input and output shafts 33, 34 are turning at the selected synchronous speeds. One brush of each generator 56 and 57 is connected to the mid-point of the resistance element 62 of the potentiometer. The other brushes of the generators 56, 57 are respectively connected to dual sliding contactors 63, 64 of the potentiometer engaging resistance element 62 on opposite sides of the mid-point thereof. The resistors 59, 61 are connected in two parallel arrays to resistance element 62 on opposite sides of its mid-point and as the contactors 63, 64 slide along the element 62, the ratio of the resistances of the current paths through pairs of the resistors 59, 61 is correspondingly appropriately varied. To facilitate the selection of such resistance ratios in inverse relation to shaft speed ratios of the various speed ranges selected by selector control 19, the sliding contactors 63, 64 are rigidly attached to a linkage 66 which is in turn pivotally secured to a lever arm 67 fixed to selector lever 18 of control 13. As selector lever 18 is rotated to the various speed ranges, the resistance ratios of potentiometer 58 are appropriately responsively varied. The parallel arrays of resistors 59 and 61 are series connected to rectifiers 68, 69 which are in turn connected to the first and second inputs of differential current detector circuit 41.

Regarding the general operation of control circuit 14 in response to a change in speed range effected by manual operation of selector control 13, the initial movement of selector lever 18 momentarily interrupts the flow of current therethrough from battery 28 to the servo system 16. Transmission 11 is in turn neutralized thereby causing the speed ratio of input and output shafts 33, 34 to depart from their previous condition of synchronism. A corresponding change in the output currents of tachometer generators 56, 57 results in an unbalance in the currents applied through double potentiometer 58 to the inputs of differential circuit 41 occurs. The condition of unbalance energizes relay 42 and the normally closed contact 43 is responsively opened to thereby de-energize master control relay 36 while normally open contact 44 is closed to apply current to micro switch 27. This de-energization of relay 36 opens the normally open contact 37 thereof and hence disrupts the flow of servo operating current from battery 28 to contactor 19 of the selector control 13. Upon the completion of rotation of selector lever 18 to the desired speed range, the corresponding inverse resistance ratio is established in double potentiometer 58 by virtue of the linkage 66 and lever arm 67 coupled therebetween. The current applied to micro switch 27 as well as current applied to contacts 24 appropriately energize the clutch operating portion 31 and fuel pump bumper operating portion 32 of servo system 16 to bring the speed ratio of input and output shafts 33, 34 into correspondence with the selected speed range at selector control 13. Upon the attainment of the selected synchronous shaft speed ratio, the proportional currents of tachometer generators 56, 57 as applied to the new ratio of resistances selected in double potentiometer 58 produce balanced currents at the inputs to differential circuit 41. Such current balance hence disrupts the flow of current to the operating solenoid 46 of relay 42 and contact 43 is closed. Master control relay 36 is in turn re-energized and normally open contact 37 is closed to again supply servo operating current from battery 28 to contactor 19 of selector control 13. Such current flows through the contactor 19 to the selected gear engaging servo portion 29 connected to the engaged contact 23. The re-establishment of servo operating current thus energizes the selected servo portion 29 to cause same to engage the selected gear of transmission 11 at the instant the input and output shafts 33, 34 thereof are turning at the selected synchronous speeds.

In some instances the vehicle 12 may include an auxiliary or overdrive transmission in which case a secondary control circuit 71 is provided paralleling the primary control circuit 14 as shown in Fig. 2. Control circuit 71 automatically controls the auxiliary transmission in substantially the same manner as circuit 14 controls the primary transmission 11. More particularly, secondary control circuit 71 preferably includes a master control relay 72 having a normally open contact 73 series connected in an auxiliary servo current supply line between battery 28 and movable contactor 74 of an auxiliary transmission speed range selector switch 76 which is physically mounted in a readily accessible location to an operator of the vehicle. A pair of fixed contacts 77, 78 of switch 76 selectably engageable by movable contactor 74 are respectively coupled to high and low range actuating portions of an electromagnetically controlled fluid operated auxiliary transmission operating servo 79. Servo 79 serves to shift the auxiliary transmission between low and high speed ranges in response to movement of contactor 74 between contacts 77 and 78, respectively. Actual shifting is accomplished, however, under synchronous speed conditions of the input shaft 81 of the auxiliary transmission and input shaft 33 of primary transmission 11 as determined by secondary control circuit 71.

Considering now again master control relay 72, it is additionally provided with a normally closed contact 82 coupled in series between battery 28 and clutch operating servo 31 which operates as subsequently described. The master control relay 72 is controlled by a differential current detector circuit 83 which is substantially identical to the detector circuit 41 of the primary control circuit 14. Detector circuit 83 hence includes a relay 84 having a normally closed contact 86 coupled between battery 28 and one side of the operating solenoid 87 of master control relay 72, the other side of which solenoid is connected to ground. The operating solenoid 88 of relay 84 is connected between the battery 28 and differential current switch means 89 including transistors 91, 92 connected in identical fashion as the transistors 47, 48 of primary differential circuit 41. The transistorized differential current switch means 89 functions in the same manner as the identical means in circuit 41 and is accordingly not again described in detail herein. The first and second inputs to switch means 89 are respectively coupled through rectifiers 93, 94 to the movable contactor 74 of selector switch 76 and the output of tachometer generator 56. A tachometer generator 96 is shaft connected to the input shaft 81 of the auxiliary transmission and hence provides an alternating current across the brushes of such generator directly proportional to the rotational speed of shaft 81. A pair of phase sensing resistors 97, 98 are respectively connected between one brush of generator 96 and a pair of fixed contacts 99, 101 paralleling fixed contacts 77, 78 of selector switch 76. A voltage dividing resistor 102 is connected between contacts 99 and 101 and the other brush of generator 96 is connected to an intermediate point of the resistor 102 so as to provide a resistance ratio inversely related to the synchronous speed ratio of the high or overdrive range of the auxiliary transmission.

The overdrive selector switch 76 in normal operations of vehicle 12 is placed in the low range position, i.e., contactor 74 engages contacts 78 and 101, and the selector control 13 is manipulated to select desired speed ranges of primary transmission 11 in the manner previously described. When the tractor is in operation, the operator manipulates overdrive selector switch 76 to the high range position, i.e., contactor 74 engages contacts 77 and 99, to gain a more advantageous gear ratio. In breaking contact between contactor 74 and fixed contacts 78, 101, the supply of servo current from battery 28 to auxiliary transmission operating servo 79 is interrupted and the auxiliary transmission is responsively neutralized. The speeds of auxiliary transmission input shaft 81 and primary transmission input shaft 33 hence depart from the synchronous speeds corresponding to low range. An immediate unbalance in the currents generated by tachometer generators 96 and 56 as applied to the inputs of differential current switch means 89 is in turn effected and solenoid 88 of relay 84 energized. Contact 86 of this relay is consequently opened and master control relay 72 responsively de-energized. Contact 82 of control relay 72 opens to interrupt the flow of servo operating current to contactor 74 of selector switch 76 while contact 73 is closed to supply current to the clutch operating servo 31. The clutch operating servo functions as subsequently described to bring the speed ratio between input shafts 81, 33 to the synchronous ratio corresponding to the high range of the auxiliary transmission. When the synchronous ratio is attained, the currents generated by tachometer generators 96, 56 as adjusted by resistors 97, 98, 102 are balanced in their application to the inputs of differential current switch means 89. Relay 84 is thus de-energized and master control relay 72 re-energized to re-apply servo current to contactor 74 of selector switch 76. The current is applied through contactor 74 to high range contact 77 and consequently to the high range actuating portion of auxiliary transmission operating servo 79. Servo 79 responsively shifts the gears of the auxiliary transmission to the high range position, and by virtue of the speed sensing action of secondary control circuit 71, the shift is accomplished when the shafts 81, 33 are turning at synchronous speeds.

To efficiently shift the auxiliary transmission to low range in order, for example, to overcome rolling resistance requiring increased power for a short period of time to overcome added inertia, an override control is provided to facilitate actuation of the fuel pump rack bumper operating servo 32 when shifting from high to low range. More specifically, in order to by-pass differential current detector circuit 83 and obtain direct actuation of the rack bumper, an auxiliary contact 103 is provided on selector switch 76 adjacent the low range contact 78 thereof. Contact 103 is directly connected to the means for actuating bumper servo 32. The downshift control will remain inoperative until contactor 74 is depressed hard enough to energize the by-pass contact 103 and fuel pump rack bumper servo 32 because the torque load prevents actuation of the auxiliary transmission servo 79. Completion of the shift to low range thereafter remains subject to the synchronizing control of circuit 71 in substantially the same manner as described in relation to the shift to high range.

Considering now in detail the fluid servo system 16 previously mentioned, it is to be noted that the various primary transmission gear engaging servos 29 and auxiliary transmission servo 79 are each generally provided as three position fluid operated piston means, the flow of fluid to which is controlled by solenoid operated valves energized from selector control 13. One of the servos 29 is provided to actuate each one of the shifter forks 104 of transmission 11 between two speed range gear selecting positions and an intermediate neutral position. In a five speed transmission as herein depicted for the transmission 11 of vehicle 12, there are accordingly provided three gear engaging servos 29, one each for shifting the forks 104 between reverse and first speed ranges, second and third speed ranges, and fourth and fifth speed ranges. The auxiliary transmission servo 79 is similarly adapted to shift an overdrive shifter fork 106 of the auxiliary transmission between low and high speed range positions and an intermediate neutral position. It will be appreciated that servos 29 and 79 may hence be provided as double-acting pneumatic servos 107 as illustrated in Fig. 3, or alternatively, as three position hydraulic servos 108 as illustrated in Fig. 4.

Servos 107 are generally conventional double acting servos, each having a cylinder 109 centrally partitioned into two pressure sealed chambers 111, 112. Within the chambers there are respectively provided pistons 113, 114 slidably engaging the chamber walls. A piston rod 116 is secured to piston 113 and extends through the end wall of chamber 111 in slidable relation thereto for fixed end attachment as shown generally at 117. A second piston rod 118 is secured to piston 114 and extends through the end wall of chamber 112 in slidable relation thereto for attachment to one of the transmission shifting forks 104. Ports 119 are provided at the opposite ends of each of the chambers 111, 112 for connection to a pair of spring-loaded, four way solenoid valves 121, 122 to which pneumatic pressure lines 123 are respectively connected. The operating solenoids of valves 121, 122 are respectively connected between ground and appropriate ones of the fixed contacts 23 of selector control 13 in the case of primary transmission servos 29, and to the contacts 77, 78 of overdrive selector 76 in the case of auxiliary transmission servo 79. With both of the solenoid valves 121, 122 de-energized, the valves direct pneumatic pressure from lines 123 into, for example, the right hand ones of ports 119 to thereby urge pistons 113, 114 into positions of maximum left hand displacement relative to the chambers 111, 112. The overall displacement of piston rod 118 relative to fixed position 117 at this time corresponds to the neutral position of the shifting fork 104 connected thereto, which position is depicted in Fig. 3. Upon energization of the solenoid valve 121, the valve operates to apply pressure to the left hand port of chamber 112 and simultaneously discharge pressure from the right hand port thereof. Inasmuch as cylinder 109 is retained in a fixed position of maximum leftward displacement by the continued application of pressure to the right hand side of fixed piston 113, piston 114 is urged to the right within chamber 112. Maximum rightward displacement of piston 114 corresponds to, for example, second speed range of shifting fork 104. In the event solenoid valve 122 is selected for energization, valve 121 being now de-energized and shifting fork 104 being initially in the intermediate neutral position, pneumatic pressure is applied to the left hand port of chamber 111 and pressure is simultaneously released from the right hand port thereof. Inasmuch as the position of piston 113 is fixed, the entire cylinder 109 is responsively translated to the left to a position wherein the right hand end wall of chamber 111 contacts piston 113. Piston 114 is, moreover, in a position of maximum leftward displacement relative to chamber 112 when valve 121 is de-energized. Hence, the overall displacement of piston rod 118 relative to fixed position 117 corresponds to, for example, the third speed range position of shifting fork 104. In a like manner the pneumatic servos 107 as employed for the various servos 29 and 79 function to shift the gears into desired speed ranges as selected by manipulation of selector control 113 and overdrive range selection switch 76 and synchronously controlled by control circuits 14 and 71.

Considering now the hydraulic servos 108 as best shown in Fig. 4, and which may be employed instead of pneumatic servos 29 and 79, each of these servos 108 preferably comprises a piston 124 rigidly attached to one of the shifting forks 104, a floating piston 126, and a cylinder 127 suitably supporting the pistons for limited and selective axial movement. More specifically, piston 124 is rigidly attached to a piston rod 128 secured at one end to shifting fork 104 and slidably engaging an inwardly stepped wall portion 129 of cylinder 127. The inwardly stepped edge of wall portion 129 also provides a stop for floating piston 126 which slidably engages both the piston rod 128 and enlarged wall portion of cylinder 127. A four-way solenoid valve 131 is coupled between a centrally located port 132 disposed at the inwardly stepped edge of wall portion 129 and a port 133 at the other end of this wall portion. A three-way solenoid valve 134 is coupled to a port 136 at the end of the enlarged wall portion of cylinder 127. Valves 131, 134 are also coupled to pressurized hydraulic fluid supply lines 137 with the valves directing the fluid to the various ports in accordance with the selected electrical energization of the valves from selector control 13, overdrive selector switch 76, and control circuits 14 and 71. In this regard, valves 131, 134 are respectively connected between ground and appropriate ones of the fixed contacts 23 of selector control 13 in the case of servos 29, and to the contacts 77, 78 of overdrive selector switch 76 in the case of servo 79. With no servo current applied to valves 131, 134, such valves direct the hydraulic fluid from supply lines 137 simultaneously through ports 133, 136 to both ends of cylinder 127. The different diameters of pistons 124, 126 create a pressure differential on these two members such that floating piston 126 is held against the stop formed by the stepped edge of wall portion 129 and fixed piston 124 is urged against the floating piston 126. The resulting position of piston rod 128 corresponds to the neutral position of shifter fork 104. Energization of valve 131 effects the direction of fluid to port 132 and discharge of fluid from port 133. Fixed piston 124 is hence urged toward the right with piston rod 128 correspondingly changing the position of shifting fork 104 to one of the selectable speed ranges. The other speed range position of shifting fork 104 is determined by energizing solenoid valve 134 (valve 131 being de-actuated) which in the energized position releases hydraulic fluid through port 136. Floating piston 126 is hence no longer retained against the stop and the pressure against fixed piston 124 urges both pistons to the left with a resultant change of shifting fork 104 to another speed range position.

Considering now the clutch operating servo 31 previously mentioned, it is preferably provided as a single-acting pneumatic servo (see Fig. 2) although a hydraulic servo may as well be employed, particularly where hydraulic servos 108 are employed as servos 29 and 79. More specifically, servo 31 includes a fixed cylinder 138 with a piston 139 slidably engaging the interior walls thereof. A piston rod 141 is secured to piston 139 and extends through the end wall of cylinder 138. The end of piston rod 141 is rigidly secured to the clutch pedal operating mechanism 142 of clutch 17. Clutch 17 when engaged is connected to input shaft 33 and in addition a clutch brake 143 is coupled to the clutch pedal operating mechanism 142 for engagement with the input shaft 33 when clutch 17 is disengaged. The piston 139 is retained in contact with one end wall of cylinder 138 by the spring loaded return action of clutch pedal mechanism 142 when clutch 17 is in its normally engaged position. A port 143 is provided in this end of cylinder 138 and the port is coupled to a two-way solenoid operated valve 144. The inlet port of the two-way valve 144 is supplied by a pressurized fluid line 146 and when the solenoid of the valve is energized, the valve operates to direct the fluid into port 143. Piston 139 is thereby urged to the opposite end of cylinder 138, thus disengaging the clutch 17 and engaging the clutch brake 143. The exhaust port of valve 144 is coupled to an exhaust volume tank 147 so that when the operating solenoid of the valve is de-energized, the exhaust fluid from the cylinder 138 as piston 139 is returned to its normal position is temporarily absorbed and retarded. An orifice 148 in tank 147 controls the bleed-off of the exhaust therefrom and assures a constant rate of re-engagement of clutch 17. One terminal of the operating solenoid of valve 144 is connected to ground and the other terminal thereof is commonly connected to the micro switch 27 of selector control 13 and to the normally closed contact 73 of the secondary control circuit master control relay 72. The energization of solenoid valve 144 and resultant declutching and braking of the input shaft 33 of transmission 11 is hence automatically effected on up-shifts by the sensing control circuits 14 and 71 in the manner previously mentioned. During an up-shift the disengagement of clutch 17 and engagement of clutch brake 143 rapidly slows the input shaft 33 of transmission 11 to approach synchronism with the output shaft 34 for the selected higher speed range.

The fuel pump bumper operating servo 32 previously mentioned, comprises a fuel rack bumper 149 operated by a solenoid 151. The solenoid 151 is energized through the normally open contact 152 of a relay 153, such contact 152 being series connected with servo operating battery 28. The operating solenoid 154 of relay 153 is connected between ground and one side of a condenser 156, the other side of which is commonly connected to the ganged contacts 23 of selector control 13 and to the auxiliary override contact 103 of overdrive selector switch 76. In down-shifting, either by counterclockwise rotation of selector lever 18 of selector control 13 or in manipulating overdrive selector switch 76 to the low range position, an instantaneous current surge is applied to relay solenoid 154 by virtue of the condenser 156 series connected therewith. The relay 153 is hence momentarily energized to apply current through contact 152 to solenoid 151. The instantaneous energization of solenoid 151 causes the bumper 149 to bump the fuel pump rack 157 of the vehicle engine. This bumping of the fuel rack relieves the forces in the transmission which resist shifting without materially altering the speed of the engine. The input shaft 33 of transmission 11 is hence sped up to approach the synchronous speed with output shaft 34 corresponding to the selected lower speed range. The fuel pump rack bumper 149 operates in conjunction with the governor control disclosed in United States Patent No. 2,767,700 to Parks, and reference may be had to such patent for a complete description of its operation.

Considering now the operational procedure for the preferred embodiment of the electric-fluid transmission control of the present invention, the operator of the vehicle selects the speed at which he wants to operate by manipulating speed range selector control 13. For example, in shifting from second to third speed, control 13 and the integral micro switch 27 thereof operated by the overrunning clutch action previously described function simultaneously to break contact with the primary transmission gear engaging servos 29 through contacts 23 while determining whether the operator is shifting up or down.

In an up-shift, initial movement of selector lever 18 neutralizes the control by disrupting the flow of current from battery 28 through contactor 19 and contacts 23 to the gear engaging servos 29. The resulting unbalance in the currents supplied to differential current detecting circuit 41 from tachometer generators 56, 57 energizes relay 42 to open master control relay 36 and disrupt the supply of servo operating current to the gear engaging servos 29. Energization of relay 42 also provides current through contact 44 and micro switch 27 for the energization of clutch operating servo 31. Clutch 17 is thereby disengaged and clutch brake 143 applied. Completion of a new speed selection through selector control 13 will simultaneously keep clutch 17 disengaged and brake 143 applied to effect rapid attainment of the new synchronous speed ratio between input and output shafts 33, 34. The foregoing also allows tachometer generators 56, 57 to obtain the new voltage differential as determined by selector control 13 through potentiometer 58 and equivalent to the selected gear speeds. Synchronization of the gears is obtained quickly and results in the immediate closing of master control relay 36 by virtue of the action of differential current detector circuit 41 previously described. Reclosing of relay 36 activates the servo 29 selected by selector control 13 and such servo effects shifting of the gears to the selected range. The control circuit 14 in accordance with the present invention when constructed from conventional components effects shifting of the selected gears when the relative speeds of input and output shafts 33, 34 is within approximately one r.p.m.

In down-shifting, such as from fourth to third, the operator actuates selector lever 18 of selector control 13 counterclockwise to acutate the fuel rack bumper servo 32 through contacts 24. The fuel rack 157 is responsively bumped as hereinbefore described and clutch 17 remains engaged inasmuch as micro switch 27 is open. The transmission 11 is neutralized in the same manner as for an up-shift and input shaft 33 is sped up to rapidly bring the relative speeds of shafts 33, 34 to the desired degree. Control circuit 14 functions in the same manner as that described for an up-shaft and hence the subsequent completion of the shift from neutral to a lower speed is subject to the synchronizing action. In down-shifting from fifth to fourth speed, the engine of vehicle 12 is operating at maximum speed and can no longer safely increase the output of generator 56 the proportionate amount necessary to bring differential current detector circuit 41 into balance. It is, therefore, necessary when shifting from fifth to fourth to temporarily apply the service brakes to reduce the output of generator 57 and thereby obtain the corresponding shaft speed ratio.

The operation of the electric-fluid transmission control in starting the vehicle 10 from a standing position in either a forward or reverse direction is generally similar to that just described for shifting operations with the vehicle in motion. One important distinction, however, is that with the vehicle standing still in neutral, the output generator 57 is not operative. The input generator 56 is driven by the engine, but inasmuch as the transmission gears are disengaged and the rear or drive wheels are stationary, there is no motivation for the output generator. The instant the operator turns selector lever 18 from neutral to first gear position in the embodiment of Fig. 2, however, the contactors 63, 64 of double potentiometer 58 engage the first pair (right hand pair in Fig. 2) of resistors 59, 61 corresponding to the first speed ratio. Inasmuch as only generator 56 is operative, an unbalance in the currents supplied to detector circuit 41 is established. Relay 42 is responsively energized to in turn open master control relay 36 and disrupt the supply of servo operating current to gear engaging servos 29. At the same time relay 42 closes the circuit through its contact 44 to thereby energize clutch operating servo 31 and disengage clutch 17. With the clutch disengaged the engine is uncoupled from the input shaft 33 of the transmission and therefore from input generator 56. The generator 56 stops and therefore a balanced condition of zero current flow from both generators is established in the detector circuit 41. The relay 42 is deenergized and relay 36 energized to close the servo operating current circuit to the selected first gear engaging servo 29, thereby shifting the gears to first range. Relay 42 simultaneously disrupts the supply of current to clutch operating servo 31 by the opening of contact 44. The clutch 17 is thus engaged at a constant rate determined by the bleed-off of the exhaust fluid from the servo 31 into exhaust volume tank 147. In some instances the electrically control start effected in the above-described manner might not be as smooth as desired, in which instances some improvement can be effected by the operator manipulating the clutch pedal 142 in the normal fashion.

In starting the vehicle from a standing position in the reverse direction, it will be noted that in accordance with the embodiment of Fig. 2, this operation is accomplished independently of the selector control 13 by means of a separate reversing switch 30, not included as an integral component of the electronic speed sensing control circuit 14. More specifically, switch 30 is merely a single pole double throw switch having selector contactor 30a and fixed contacts 30b and 30c. The contactor 30a is coupled to the servo operating current supply 28 and the contact 30b is connected to the contactor 37 of master control relay 36. Contact 30c is series connected with the reverse gear shift effecting solenoid operated valve 131 of the first and reverse gear engaging one of servos 29. With contactor 30a closed with contact 30b, the selector control 13 is thus coupled to the operating current supply 28 and all forward shifting operations are accomplished synchronously by the control circuit 14 in the manner previously described. With the contactor 30a turned to contact 30c, however, the servo operating current is diverted from the selector control 13 directly to the reverse gear engaging servo 29 whereby the reverse gears are engaged. Operation of clutch 17 during the reverse start is accomplished manually by manipulation of foot pedal 142.

Where an auxiliary transmission is employed in the vehicle 12 and the transmission control 10 of the present invention includes the secondary control circuit 71 and auxiliary transmission shifting servo 79, in normal operations, starting is generally effected by manually disengaging clutch 17 through the pedal operating mechanism 142, placing auxiliary transmission selector switch 76 in low range, and manipulating selector control 13 to select succeeding speed ranges. To change from low to high range and gain a more advantageous gear ratio, switch 76 is thrown to the high range position. The auxiliary transmission servo 79 is responsively neutralized by the interruption in current through switch 76 and master control relay 72 is hence de-energized. Current for declutching is supplied through contact 73 of such relay to clutch operating servo 31. The resultant declutching action effected by servo 31 brings the input shaft 33 and auxiliary transmission input shaft 81 to synchronous speeds for the high speed range. The appropriate voltage differential between the outputs of tachometer generators 56, 96 is in turn obtained to balance differential current detector circuit 83. Control relay 72 is responsively energized to actuate servo 79 and thereby engage the high speed range gears of the auxiliary transmission at synchronous speed.

Down-shifting of the auxiliary transmission, as previously described, is generally employed to acquire added power most conveniently by moving switch 76 to low range rather than down-shifting through selector control 13. The override contact 103 of switch 76 is engaged by depressing the switch hard. The fuel rack bumper servo 32 is responsively actuated to cause the relative speeds of shafts 33 and 81 to approach the low range synchronous ratio. The remainder of the shift to low range is controlled and subject to the auxiliary control circuit 71 in substantially the same manner as that described for an up-shift of the auxiliary transmission.

Various departures may be made from the preferred embodiment of the present invention depicted in Fig. 2 and hereinbefore described without altering the salient aspects of the invention. One example of such a departure is illustrated in Fig. 5 wherein there is provided an electric fluid transmission control 158 which is generally similar to the control 14 but for several modifications. In the modified control 158 of Fig. 5, components like those of the control of Fig. 2, are referred to by like numerals. In the control 158, a manual overdrive selector switch 159 is directly connected between battery 28 and the auxiliary transmission operating servo 79. No synchronizing control is provided for employment with the auxiliary transmission, the selection of high and low ranges being accomplished without synchronizing action and automatic declutching by manual operation of selector switch 159 and manual operation of clutch 17. The principal modification of the control, however, resides in the elimination of the fuel rack bumper servo 32 and revised connections to the clutch operating servo 31 to extend the function of same to down-shift operations. More particularly, the ganged contacts 24 of selector control 13 are, in modified control 158, connected to solenoid valve 146 of clutch operating servo 31, together with the connection thereto of micro switch 27. Hence, in an up-shift, initial movement of selector lever 18 of selector control 13 engages and energizes one of the contacts 24 to thereby energize servo 31 and disengage clutch 17. Micro switch 27 and contact 44 of relay 42 are immediately closed resulting in a continued flow of current to the clutch operating servo 31. The clutch 17 remains disengaged and clutch brake 143 applied to retard the input shaft 33 of transmission 11 until synchronism is obtained and the appropriate gears are shifted in the same manner as control 10.

In down-shifting, micro switch 27 does not make or hold contact for the clutch servo 31 because of the overrunning clutch action of selector control 13 described in relation to control 14. Actuation of selector lever 18 in a down-shift will, however, momentarily transmit current through contacts 24 to the servo 31 to disengage the clutch 17 only while the gears are disengaged. Continuation of the down-shift or engagement of the lower speed gear is made with the clutch engaged. Such engagement of the clutch 17 and associated disengagement of clutch brake 143 allows relative speeds of the input and output shafts of said transmission to synchronous speed ratios corresponding to the speed ranges selected by said selector control, and an electric shaft speed sensing circuit coupled to said selector control for sensing the synchronous speed ratios of said input and output shafts corresponding to the speed ranges selected by said selector control and responsively actuating said servo system through the input shaft 33 of transmission 11 to speed up to attain synchronous speed for the selected lower speed gear. The foregoing differences in the function of selector control 13 for up and down shifting operations facilitate an automatic synchronization of the desired speeds by the movement of the vehicle 12 or unloaded engine thereof.

In the modified control 158 of Fig. 5, one further departure from control 14 resides in the employment of one of the contacts 23 of selector control 13 as a reverse gear position whereby shifting of the gears to reverse is facilitated by the selector control as opposed to the separate reversing switch 30 of control 14. More particularly, the contact 23 in counter-clockwise direction from that utilized as neutral position, is utilized as reverse and is accordingly correspondingly connected to the solenoid actuated valve 121 of the reverse gear—first gear engaging servo 109. Thus upon shifting the selector lever 18 of selector control 13 from neutral to reverse position, the contactor 63 of double potentiometer 58 is moved from the center tap 62 corresponding to neutral position into engagement with the first one of resistors 61 (leftmost one of the resistors 61 as depicted in Fig. 5), while the contactor 64 remains out of contact with the resistors. Such movement of the contactor creates an immediate state of unbalance in the currents applied to the differential circuit 41 inasmuch as the output of input generator 56 is applied to one of the resistors 61 whereas no current is applied to the resistors 59. Relay 42 is responsively energized thereby closing contact 44 and supplying operating current to the clutch operating servo 31. The clutch 21 is in turn disengaged and clutch brake 143 applied to uncouple the input shaft 33 of transmission 11 from the engine and terminate the rotation of this shaft. The output of input generator 56 drops to zero and the currents applied to differential circuit 41 are thus again balanced and relay 42 deenergized. As a result, the clutch operating servo 31 is deenergized and master control relay 36 energized to apply servo operating current to the plunger contactor 19 of selector lever 18. Since the contactor 19 is engaged with the reverse gear position contact 23, the servo operating current is applied to the reverse gear engaging one of servos 109 which thereby shifts the gears to reverse. The simultaneous deenergization of clutch operating servo 31 effects engagement of the clutch 17 and accordingly movement of vehicle 10 in the reverse direction.

We claim:

1. A shift control for a power transmission assembly comprising a manually operable speed range selector control; an electromagnetically controlled fluid actuated servo system electrically connected to said selector control and mechanically connected to said transmission to engage the gears thereof in accordance with speed range selections of said selector control in response to the application of servo control current thereto, said servo system including means for adjusting the relative speeds of the input and output shafts of said transmission assembly to synchronous speed ratios corresponding to said speed range selections of the selector control; and a shaft speed sensing control circuit for controlling the application of current to said selector control, said control circuit including shaft speed transducers respectively coupled to the input and output shafts of said transmission for generating electrical signals in direct proportion to the speeds of said shafts, differential current detector means responsively coupled to said shaft speed transducers and comparing the electrical signals generated therefrom, said detector means producing a control signal when the compared transducer signals correspond to the synchronous speed ratio of a speed range selection of said selector control, a source of servo control current, and means coupling said source to said selector control in response to the control signals of said detector means whereby said servo system is controlled to engage the gears selected by said selector control when the relative speeds of the input and output shafts of said transmission assembly correspond to the synchronous speed ratio of the selected speed range.

2. A manually selectable automatic shift control for a power transmission assembly comprising a manually operable speed range selector control having a plurality of selectable circuit closing positions respectively corresponding to the speed ranges of said transmission and circuit closure means selectively responsive to up-shift and down-shift selections respectively of the speed range positions; a servo system having a plurality of electromagnetically controlled fluid actuated gear engaging servos respectively electrically connected to the circuit closing speed range positions of said selector control and mechanically coupled to the corresponding speed range gears of said transmission assembly, said servo system further including electromagnetically controlled fluid actuated shaft speed retarding and advancing servos electrically responsively connected to said circuit closure means and mechanically coupled to the input shaft of said transmission; and a shaft speed sensing control circuit for controlling the application of control current to said selector control, said control circuit including shaft speed transducers coupled to the input and output shafts of said transmission for generating electrical currents in direct proportion to the speeds of said shafts, a source of servo control current, and a differential current detector circuit coupled to said transducers for comparing the currents therefrom and responsively connecting said source to the circuit closing positions of said selector control when the currents are indicative of synchronous speed ratios corresponding to the selected circuit closing speed range positions of said selector control, said detector circuit responsively connecting said source to the up-shift and down-shift circuit closure means of said selector control when the currents are indicative of departures from said synchronous speed ratios.

3. A shift control for a power transmission assembly comprising a manually operable speed range selector control having a plurality of selectable circuit closing positions respectively corresponding to the speed ranges of said transmission and circuit closure means selectively responsive to up-shift and down-shift selections of the speed range positions; a servo system having a plurality of fluid actuated gear engaging servos electromagnetically controlled responsive to the application of electric current thereto, said servos electrically connected to the circuit closing speed range positions of said selector control and mechanically coupled to the corresponding speed range gears of said transmission assembly, said servo system further including fluid actuated shaft speed advancing and retarding servos electromagnetically controlled responsive to the application of electric current thereto and electrically connected to said circuit closure means and mechanically coupled to the input shaft of said transmission; and a control circuit including a source of servo operating current, a master control relay having a normally open contact serially connected between said source and the circuit closing speed range positions of said selector control, tachometer generators shaft connected to the input and output shafts of said transmission assembly, null balance ratio detecting means having inputs responsively coupled to said tachometer generators and an output, said ratio detecting means effecting zero current flow in said output only in response to currents applied to the inputs in the same ratio as synchronous shaft speed ratios corresponding to the selected circuit closing speed range positions of said selector control while effecting current flow in the output the remainder of the time, and relay means responsively connected to the output of said detecting means and having normally closed contacts connected in energizing relation to said master control relay and normally open contacts connected in energizing relation to said up-shift and down-shift selectively responsive closure means of said selector control.

4. A shift control for a power transmission assembly as set forth in claim 3, further in which said ratio detecting means comprises a double potentiometer having a pair of sliding contactors mechanically coupled to said selector control for selecting pairs of resistances in ratios inversely related to corresponding synchronous shaft speed ratios of the selectable speed range positions of the selector control, said tachometer generators being electrically coupled to said pair of sliding contactors, and null balance switch means having first and second inputs connected to the selected pairs of resistances of said double potentiometer and having an output connected in energizing relation to said relay means.

5. A vehicle transmission speed change control comprising a servo system for shifting the gear ratios of a transmission and having a plurality of gear shifting forks operatively coupled to said transmission, each one of said forks having a pair of selective successive speed range positions and an intermediate neutral position, a clutch coupled to the input shaft of said transmission, a clutch brake coupled to said clutch for engagement with the input shaft when the clutch is disengaged therefrom, a plurality of three position solenoid controlled fluid actuated servos mechanically coupled to said shifting forks to actuate same between said neutral position and a pair of successive speed range positions in response to energization of the servos with control current, a two position solenoid controlled fluid actuated servo mechanically coupled to said clutch to disengage same upon energization with control current, and an electromagnetic fuel pump rack bumping servo for instantaneously bumping the fuel pump rack of said vehicle upon energization with control current; a manually operable speed range selector control having a rotatable selector contact and a first plurality of fixed contacts with a second plurality of fixed contacts alternately interleaved therewith, said selector contact selectively engaging said first plurality of fixed contacts and engaging the second plurality of contacts upon disengagement from selected ones of the first plurality of contacts, said first plurality of contacts corresponding to successive speed ranges of said transmission and electrically to corresponding ones of said three position servos, said second plurality of contacts commonly coupled to said fuel pump rack bumping servo, a micro switch carried by said selector control, an overrunning clutch coupling said selector contact to said micro switch and closing same upon rotation of the selector contact in an up-shift direction, said micro switch being connected to said two position clutch disengaging servo; and a shaft speed sensing control circuit including a source of servo control current, a master control relay having a normally open contact serially connected between said source and the selector contact of said selector control, a pair of tachometer generators shaft connected to the input and output shafts of said transmission, a double potentiometer having a pair of sliding contactors mechanically coupled to the selector contact of said selector control for selecting pairs of resistances in ratios inversely related to the shaft speed ratios of the corresponding speed ranges selected by said selector contact, said sliding contactors of said potentiometer being electrically connected to said tachometer generators, null balance switch means having first and second inputs connected to the selected pairs of resistances of said double potentiometer and having an output in which current flow is disrupted in response to balanced currents applied to the inputs, a relay responsively connected to the output of said null balance switch means and having a normally closed contact connected in energizing relation to said master control relay and a normally open contact connected in energizing relation to said micro switch.

6. A vehicle transmission speed change control as set forth in claim 5 in which said three position fluid servos each comprise a centrally partitioned cylinder having two pressure sealed chambers, a pair of pistons respectively slidably engaging the walls of said chambers, a piston rod secured to one of said pistons and extending through the end wall of the corresponding chamber, means securing said piston in fixed position, a second piston rod secured to the other of said pistons and extending through the end wall of the corresponding chamber for attachment to one of said shifting forks, a pair of spring loaded four way solenoid actuated valves communicably connected between the opposite ends of each chamber, and a pressurized pneumatic supply line connected to said valves.

7. A vehicle transmission speed change control as set forth in claim 5 in which said three position fluid servos each comprises a hydraulic cylinder having an inwardly stepped wall portion extending from one end to the mid-length thereof, a piston slidably engaging said inwardly stepped wall portion, a piston rod rigidly secured to said piston and extending through an end wall of said cylinder for rigid attachment to one of said shifting forks, a floating piston slidably engaging the enlarged wall portion of the cylinder and coaxially slidably engaging said piston rod, a four-way solenoid actuated valve communicably connected between the mid-length of said cylinder and the end of said inwardly stepped wall portion, a three-way solenoid actuated valve communicably connected to the end of the enlarged wall portion of said cylinder, and a pressurized hydraulic fluid supply line connected to said four-way and three-way valves.

8. A vehicle transmission speed change control as set forth in claim 5, further in which said two position solenoid actuated clutch disengaging fluid servo comprises a fixed pneumatic cylinder, a piston slidably engaging the interior walls of said cylinder, a piston rod secured to said piston and extending axially through the end wall of said cylinder for rigid attachment to the clutch pedal operating mechanism of said clutch, said clutch pedal operating mechanism retaining said piston at a first end of said cylinder when the clutch pedal is in its normally engaged position, a two-way solenoid actuated valve communicably connected to said first end of the cylinder, a pressurized pneumatic supply line communicably connected to said valve, and an exhaust volume tank communicably connected to said valve and having an exhaust orifice for controlling the bleed-off of fluid therefrom to effect engagement of said clutch at a constant rate.

9. A vehicle transmission speed change control as set forth in claim 5 wherein said null balance switch means comprises a pair of transistors each having at least collector, emitter, and base terminals, said collector terminals being commonly connected in energizing relation to said relay, a pair of resistors serially connected between the emitter terminals of said transistors with the common juncture of said resistors connected to ground, a second pair of resistors respectively connected between the base terminal of one transistor and the emitter terminal of the other, and a pair of rectifiers connecting the emitter terminals of said transistors to first and second input lines.

10. A vehicle transmission speed change control as set forth in claim 5 in which said fuel pump rack bumping servo comprises a solenoid actuated bumper for bumping the fuel pump rack of said vehicle upon energization, a relay having a normally open contact connected in energizing relation to said solenoid actuated bumper, and a condenser connecting the operating solenoid of said relay to said second plurality of fixed contacts of said selector control.

11. A vehicle transmission speed change control comprising a servo system for shifting the gear ratios of a transmission and including a plurality of gear shifting forks operatively coupled to said transmission, each one of said forks having a pair of selective successive speed range positions and an intermediate neutral position, a clutch coupled to the input shaft of the transmission and including a pedal operating mechanism, a clutch brake coupled to said clutch for engagement with the input shaft when the clutch is disengaged therefrom, a plurality of three-position solenoid controlled fluid actuated servos mechanically coupled to said shifting forks to actuate same between said neutral position and pair of successive speed range positions, a fixed pneumatic cylinder, a piston slidably engaging the interior walls of said cylinder, a piston rod on said piston attached to the clutch pedal operating mechanism of said clutch, said clutch pedal operating mechanism retaining said piston at a first end of said cylinder when the clutch pedal is in its normally engaged position, a two-way solenoid actuated valve communicably connected to said first end of the cylinder, a pressurized pneumatic supply line communicably connected to said valve, an exhaust volume tank communicably connected to said valve and having an exhaust orifice for controlling the bleed-off of fluid therefrom to effect engagement of said clutch at a constant rate, and an electromagnetic fuel pump rack bumping servo for instantaneously bumping the fuel pump rack of said vehicle upon energization; a selector control including a manually operable rotary selector lever, a spring loaded plunger contactor mounted longitudinally thereof, a fixed arcuately undulated cam concentrically disposed relative to the center of rotation of said lever with each undulation corresponding to a different one of the speed ranges of said transmission, a roller secured to said plunger contactor and engaging the undulations of said cam ridge, first and second pluralities of fixed contacts respectively disposed radially outward from the troughs and crests of said undulations, a micro switch mounted upon said lever, an overrunning clutch element carried by said lever and engaging said micro switch to close same upon rotation of the lever in a predetermined up-shift direction, means correspondingly connecting said first plurality of contacts in energizing relation to said plurality of three-position servos, means connecting said micro switch in energizing relation to said two-way solenoid actuated valve, and means commonly connecting said second plurality of fixed contacts to said fuel pump rack bumping servo; and a speed range sensing control circuit including a pair of tachometer generators shaft connected to the input and output shafts of said transmission, a double potentiometer having a pair of sliding contactors mechanically coupled to said selector lever for selecting resistances in ratios inversely related to the shaft speed ratios of the corresponding speed ranges determined by the position of said selector lever, said sliding contactors being electrically connected to the outputs of said tachometer generators, transistorized null balance switch means having first and second inputs respectively connected to the selected pairs of resistances of said double potentiometer and having an output in which current flow is disrupted in response to balanced currents applied to the inputs, a relay responsively connected to the output of said null balance switch means and having a normally open contact connected in energizing relation to said micro switch and a normally closed contact, a source of servo operating current, and a master control relay having a normally open contact serially connected between said source and said plunger contactor, said master control relay being responsively connected to the normally closed contact of said first relay.

12. In a shift control for a power transmission assembly which includes a primary transmission and an auxiliary overdrive transmission operatively coupled thereto, the combination comprising an electromagnetically controlled fluid actuated servo system mechanically connected to said primary transmission and auxiliary transmission to engage selected speed range gears thereof in response to electric selecting signals, said servo system including shaft speed control means for neutralizing the primary and auxiliary transmissions and adjusting the relative speeds of the input and output shafts thereof to synchronous speed ratios corresponding to said selected speed range gears; manually operable speed range selector control switch means electrically connected to said servo system for selectively channeling said selecting signals thereto and responsively actuating said shaft speed control means upon the manual selection of each speed range; and a shaft speed sensing control circuit for controlling the application of said selecting signals to said switch means including shaft speed transducers respectively coupled to the input and output shafts of said primary and auxiliary transmissions for generating electrical signals in direct proportion to the speeds of said shafts, and selecting signal generating means responsively coupled to said shaft speed transducers for comparing the electrical signals generated therefrom and generating said selecting signals when the compared transducer signals correspond to the synchronous speed ratio of a speed range selection of said selector control switch means, said selecting signal generating means being connected to said selector control switch means to apply said selecting signals thereto.

13. In a shift control for a power transmission assembly which includes a primary transmission and an auxiliary overdrive transmission operatively coupled thereto, the combination comprising an electromagnetically controlled fluid actuated servo system having a plurality of gear engaging servos correspondingly mechanically coupled to the speed range gears of the primary and auxiliary transmissions to shift selected gears from neutral positions to engaged positions in response to corresponding electrical energization of the servos, said servo system further including shaft speed retarding and advancing servos for adjusting the relative speeds of the input and output shafts of the primary and auxiliary transmissions to values approaching the synchronous speed ratios of the selected gears; speed range selection means including a manually operable primary transmission speed range selector control having a plurality of selectable circuit closing positions respectively corresponding to the speed range gears of said primary transmission and shaft speed control circuit closure means selectively responsive to up-shift and down-shift selections respectively of the speed range closing positions, said circuit closing speed range positions connected to corresponding ones of said gear engaging servos, said shaft speed control circuit closure means being connected to said shaft speed retarding and advancing servos, a manually operable auxiliary transmission speed range selector switch having selectable circuit closing positions corresponding to the speed range gears of said auxiliary transmission and shaft speed control circuit closure means selectively responsive to up-shift and down-shift selections respectively of the speed range closing positions, said closing positions being connected to corresponding ones of said gear engaging servos, said shaft speed control circuit closure means being connected to said shaft speed retarding and advancing servos; and a shaft speed sensing control circuit including shaft speed transducers respectively coupled to the input and output shafts of said primary and auxiliary transmission for generating electrical currents in direct proportion to the speeds of said shafts, a source of servo energizing current, and first and second differential current detector circuits respectively coupled to the primary transmission input and output shaft transducers and to the auxiliary transmission input and output shaft transducers for comparing the currents therefrom and responsively connecting said source respectively to the circuit closing positions of said primary transmission selector control and the circuit closing positions of said auxiliary transmission selector switch when the transducer currents are indicative of synchronous speed ratios corresponding to the selected circuit closing speed range positions of said speed range selection means, said first and second detector circuits responsively connecting said source to the shaft speed control circuit closure means of said primary transmission selector control and auxiliary transmission selector switch respectively when the transducer currents are indicative of departures from said synchronous speed ratios.

14. In a shift control for a power transmission assembly, said assembly including a primary transmission and an auxiliary overdrive transmission operatively coupled thereto, the combination comprising an electromagnetically controlled fluid actuated servo system having a plurality of gear engaging servos correspondingly mechanically coupled to the speed range gears of the primary and auxiliary transmissions to shift selected gears from neutral positions to engaged positions in response to corresponding electrical energization of the servos, said servo system further including shaft speed retarding and advancing servos for adjusting the relative speeds of the input and output shafts of the primary and auxiliary transmissions to values approaching the synchronous speed ratios of the selected gears; speed range selector switch means including a manually operable primary transmission speed range selector control having a plurality of selectable circuit closing positions respectively corresponding to the speed range gears of said primary transmission and shaft speed control circuit closure means selectively responsive to up-shift and down-shift selections respectively of the speed range closing positions, said circuit closing speed range positions electrically connected to corresponding ones of said gear engaging servos, said shaft speed control circuit closure means being electrically connected to said shaft speed retarding and advancing servos, a manually operable auxiliary transmission speed range selector switch having selectable circuit closing positions corresponding to the speed range gears of said auxiliary transmission and shaft speed control circuit closure means selectively responsive to up-shift and down-shift selections respectively of the speed range closing positions, said closing positions being connected to corresponding ones of said gear engaging servos, said shaft speed control circuit closure means being connected to said shaft speed retarding and advancing servos; and a control circuit including tachometer generators respectively shaft connected to the input and output shafts of the primary transmission and to the input shaft of the auxiliary transmission, a double potentiometer mechanically coupled to said primary transmission selector control for selecting pairs of resistances in ratios inversely related to corresponding synchronous ratios of the selectable speed range positions of the selector control, said pairs of selected resistances respectively coupled to the primary transmission input and output shaft tachometer generators whereby the currents through the resistances are equal at synchronous speeds corresponding to the selected speed ranges, a resistance voltage divider selectably connected to said auxiliary transmission selector switch and having dividing ratios inversely related to corresponding synchronous ratios of the selectable speed range positions of the selector switch, said voltage divider connected to the auxiliary transmission input shaft tachometer generator whereby the current through the divider and current generated by the primary transmission input shaft tachometer generator are equal at synchronous speeds corresponding to the selected auxiliary transmission speed ranges, first and second null balance current detection means each having first and second inputs and an output, said null balance detection means producing output current flow in response to the unbalanced input currents and zero output current flow in response to balanced input currents, the first and second inputs of said first null balance means respectively coupled to the pairs of selected resistances of said double potentiometer, the first and second inputs of said second null balance means respectively coupled to said voltage divider and the output of said primary transmission input shaft tachometer generator, a source of servo energizing current, relay means responsively coupled to the output of said first null balance means and having a first switching contact connecting said source to the selectable circuit closing positions of said selector control and a second switching contact connecting said source to the shaft speed control circuit closure means of said selector control, said first and second switching contacts respectively open and closed in response to the output current flow in said null balance means, and second relay means responsively coupled to the output of said second null balance means and having a first switching contact connecting said source to the selectable circuit closing positions of said auxiliary transmission selector switch and a second switching contact connecting said source to the shaft speed control circuit closure means of said auxiliary transmission selector switch, said first and second switching contacts respectively open and closed in response to output current flow in said second null balance means.

15. In a shift control for a power transmission assembly as defined by claim 14, the combination further defined by said first and second null balance means each comprising a pair of transistors each having at least collector, emitter, and base terminals, said collector terminals commonly connected to an output line, a pair of resistors serially connected between the emitter terminals of said transistors with the common juncture of said resistors connected to ground, a second pair of resistors respectively connected between the base terminal of one transistor and the emitter terminal of the other, and first and second input lines respectively connected to the emitter terminals of said transistors.

References Cited in the file of this patent

UNITED STATES PATENTS

| | | |
|---|---|---|
| 2,615,349 | Winther | Oct. 28, 1952 |
| 2,638,793 | Winther et al. | May 19, 1953 |
| 2,647,411 | Filocamo | Aug. 4, 1953 |
| 2,728,243 | Winther | Dec. 27, 1955 |
| 2,881,625 | Hodkin | Apr. 14, 1959 |